United States Patent [19]

Erlach

[11] 4,295,552
[45] Oct. 20, 1981

[54] MEANS FOR COUPLING A HAND DRIVE WITH A ROTATABLE SHAFT

[75] Inventor: Hans Erlach, Winterthur, Switzerland

[73] Assignee: Sulzer Brothers Limited, Winterthur, Switzerland

[21] Appl. No.: 920,287

[22] Filed: Jun. 29, 1978

[30] Foreign Application Priority Data

Jul. 15, 1977 [CH] Switzerland ............... 8831/77

[51] Int. Cl.³ .................................. F16D 11/06
[52] U.S. Cl. ................................ 192/81 C; 74/625; 192/95; 310/67 R; 403/229
[58] Field of Search .............. 192/95, 56 C, 41 S, 192/81 C, 35; 74/625; 403/229; 310/66, 67 R; 64/30 E

[56] References Cited

U.S. PATENT DOCUMENTS

| | | | |
|---|---|---|---|
| 1,208,353 | 12/1916 | Mudge | 310/66 X |
| 2,626,029 | 1/1953 | Gutterman | 192/56 C |
| 3,335,835 | 8/1967 | Conlon | 192/56 C X |
| 3,618,721 | 11/1971 | Hare | 192/41 S X |
| 3,831,724 | 8/1974 | Baer | 192/56 C |
| 3,920,106 | 11/1975 | Nisenson | 192/41 S X |
| 3,934,428 | 1/1976 | Hedin | 403/229 X |
| 4,194,605 | 3/1980 | Sessa | 192/56 C X |

Primary Examiner—C. J. Husar
Assistant Examiner—Moshe I. Cohen
Attorney, Agent, or Firm—Kenyon & Kenyon

[57] ABSTRACT

The coupling means can be mounted over a rotatable shaft of existing motors and employs a lining sleeve which is disposed about or within the shaft and a helical spring which is disposed between the sleeve and shaft. Various types of couplings are used to secure a hand wheel to one or both ends of the spring such that rotation of the hand wheel causes the spring to bind about the shaft and cause turning of the shaft. In some embodiments, rotation of the hand wheel causes the opposite end of the spring to bind about the shaft to turn the shaft with the hand wheel.

27 Claims, 11 Drawing Figures

MEANS FOR COUPLING A HAND DRIVE WITH A ROTATABLE SHAFT

This invention relates to a means for coupling a hand drive with a rotatable shaft. More particularly, this invention relates to various types of hand drives for mounting on a rotatable shaft.

As is known, various types of machines are known wherein a shaft can be coupled to a hand drive for manual turning. For example, it is known to couple the shaft of a servomotor with a hand drive to produce a redundance so as to adjust the shaft during pauses in operation, e.g. for measurement purposes or the like. However, in the case of a relatively powerful servomotor, there is a risk of injury should the hand drive rotate with the motor should the motor be sporadically switched on. In order to obviate this risk, hand drives have been constructed with a clutch which can be engaged only when the hand drive is to be operated. However, even this does not sufficiently reduce the risk of injury should the motor be started while the hand drive is in use.

It is further known that the above difficulties can be resolved by some form of interlock which can disconnect the servomotor from a power supply upon engagement of the clutch or by having the clutch automatically disengage when the servomotor current is switched on. However, both of these features require relatively complex means. Further, both detract from the reliability of operation of the servomotor.

Accordingly, it is an object of the invention to provide a means of coupling a hand wheel to a servomotor shaft so as to reduce the risk of injury to operating personnel.

It is another object of the invention to provide a manual drive for turning a shaft in either direction of rotation.

It is another object of the invention to obviate unintentional movements of a hand wheel in response to a sudden switch on of a servomotor coupled to the hand wheel.

It is another object of the invention to provide a hand drive for coupling to a servomotor shaft which is of simple low cost construction.

It is another object of the invention to provide a hand drive for coupling to a servomotor shaft which is of compact structure.

It is another object of the invention to provide a hand drive for coupling to a servomotor shaft which is capable of operation with relatively low friction losses.

Briefly, the invention provides a hand drive for coupling with a rotatably driven shaft such as a shaft of a servomotor. The hand drive includes a hand wheel for manual turning of the shaft and a coupling for coupling the hand wheel onto the shaft. This coupling includes a lining sleeve with is concentric of a shaft to define a gap therewith and a helical spring which is located concentrically in the gap between the sleeve and shaft. The spring includes a plurality of convolutions which are radially biased into engagement with the sleeve while being spaced from the shaft. The spring is also connected at least at one end with the hand wheel, for example via a means such as an entraining element, whereby, upon rotation of the hand wheel in one direction, the spring convolutions near the end of the spring which is connected to the hand wheel disengage from the sleeve and engage with the shaft. As soon as a sufficient gripping force is generated on the shaft by the spring convolutions, the shaft turns with the hand wheel.

One particular advantage provided by the invention is that the coupling is purely mechanical and does not require any auxiliary power supply. Another advantage is that the hand drive can be added to commercially available rotatable servomotors without the need for extensive or unusual modifications thereof.

In one embodiment, the lining sleeve is secured by a suitable means to a stationary member so that rotation of the sleeve is prevented. This insures that, for a given spring clearance, rotation of the hand wheel is transmitted to the shaft after a very short idle movement. In some cases, the sleeve can bear on a physically stationary member. This allows the hand drive to be disposed opposite the shaft without contacting the shaft in normal operation. Thus, if the hand drive is seldom used, there is no need for any lubrication of the spring and the parts acting thereon.

Preferably, the helical spring is made of a rectangular-section wire. This allows the outside and inside surfaces of the spring to be ground accurately. This feature also insures a high degree of reliability in operation and permits the clearance between the spring and the shaft as well as the idle movement to be relatively small.

If the hand drive is to be operated in both directions of rotation, the hand wheel can be secured to the opposite ends of the spring so as to act alternately on the spring depending upon the direction of rotation. Only a single spring need be used in such a case.

For example, in order to provide for two directions of movement, the coupling may use a pair of entraining elements coaxially of the shaft. In this case, each element is entrained with an opposite end of the spring and a transmission connects the elements in unison to the hand wheel in order to turn at the same speed as the hand wheel. The transmission then aids in bridging a range in which the sleeve is held fast. Conveniently, a clearance is left between the entraining elements and the spring ends to prevent the spring end which must be left free from bearing on the associated entraining element. This feature simplifies the construction of the hand drive.

Alternatively, instead of leaving a clearance between the spring ends and the entraining elements, the transmission may provide a clearance for the spring end which must be left free from bearing on the associated entraining element.

In order to reduce the friction of the hand drive, the two entraining elements can be provided with external teeth and placed in meshing engagement with a common pinion of the transmission.

In still another embodiment, the entraining elements of the hand drive can be made as toothed gears while the transmission includes a pair of internal toothings on a drum like member for meshing with the respective gears. In this case, the drum like member may also have a handle on the exterior for rotating the member. The overall constructions is thus relatively compact and the speed of the drive can be stepped up in a simple manner.

In another embodiment wherein gears are not to be used, for example for reasons of engineering, it is advantageous that the entraining elements are interconnected by releasable torque-transmitting elements. In this case, these releasing elements can be pivotally mounted so as to pivot in planes axially of the shaft. This feature helps to reduce friction. In addition, the transmission may utilize a stationary cam for engaging and disengaging these torque-transmitting elements in sequence during rotation of the hand wheel.

In still another embodiment, the entraining elements may be rigidly coupled together by a coupling sleeve. In this construction, the relatively heavy torque of the hand drive does not have to be transmitted through a transmission causing friction. As a result, less power is required in order to operate the hand drive. In order to prevent the lining sleeve from rotating, use may be made of pawls which engage the sleeve alternately via apertures in the coupling sleeve. In this case, the pawls can be actuated via cams which are connected to the entraining elements. Springs may also press the pawls onto the cams. This increases the hand drive friction but helps to reduce constructional costs.

It is to be noted that if at least one of the entraining elements is mounted on the shaft, the hand drive friction can be further reduced.

Another advantage of this arrangement is that the lining sleeve can be rotatably mounted on the entraining elements. This makes it unnecessary to have a physically stationary member for the sleeve to bear on.

It is to be noted that certain constructional advantages arise if the shaft is disposed horizontally. In this case, the lining sleeve can be connected to an eccentric weight such that the rotation of the sleeve is retarded relative to the entraining elements.

In still another embodiment, a transmission element can be used to connect the entraining elements in unison to the hand wheel and the transmission element can be mounted in the lining sleeve. If the lining sleeve is connected, for example via a link to a stationary member, preferably the stator of a rotating servomotor, there is no need for any kind of expensive fitting work when the hand drive is added to an existing machine.

In the case of hand drives required only for relatively low torques, it may be convenient if the two entraining elements are interconnected by a crossed chain-like drive member. This permits the use of relatively cheap plastic parts.

These and other objects and advantages of the invention will become more apparent from the following detailed description taken in conjunction with the accompanying drawings wherein.

Figure 1:
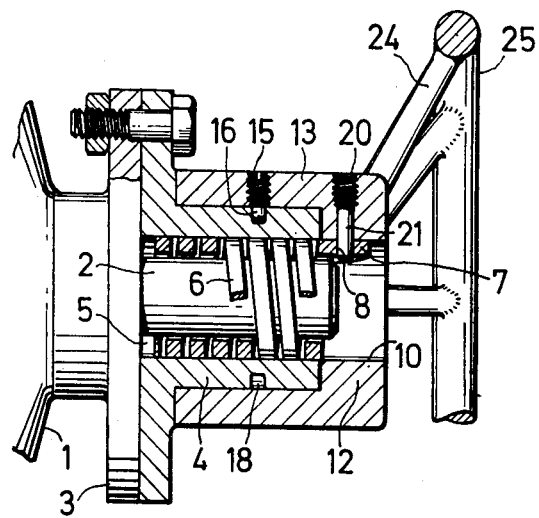
FIG. 1 illustrates a cross-sectional view of a hand drive according to the invention for use with only clockwise operation.

Referring to FIG. 1, a servomotor 1 has a shaft 2, which passes through a flange 3 at the end distal from the output end (not shown) of the shaft 2. In order to provide for a manual turning of the shaft 2, a hand drive is mounted on the servomotor 1 over the shaft end. This hand drive employs a hand wheel 25 and a coupling for coupling hand wheel 25 to the shaft 2.

The coupling includes a lining sleeve 4 disposed concentrically of the shaft 2 to define an annular gap 5 therewith and a right-hand helical spring 6. The sleeve 4 is bolted via suitable bolts to the flange 3 while the spring 6 is made of square cross-section wire. Also, one end of the spring 6 is bent into a loop 7 to form a lug 8 having a radial axis. The spring 6 is received in the sleeve 4 with a slight biasing so that the convolutions of the spring are radially biased into engagement with the sleeve 4 and are spaced from the shaft 2 in the order of 0.2 millimeters.

The coupling also has a means such as an entraining element 12 which is used to connect the loop end of the spring 6 to the hand wheel 25. As shown, the entraining element 12 has a cylindrical portion 13 which extends around a cylindrical portion of the sleeve 4 while the loop 7 of the spring 6 extends into a bore 10 of the element 12. In addition, a grub screw 15 is disposed in the cylindrical portion 13 and has a cylindrical terminal portion 16 engaging in an annular groove 18 in the sleeve 4. As a result, the entraining element 12 can be rotated around the shaft 2 but has no other freedom of movement. The entraining element 12 also receives a second grub screw 20 which has a long terminal part 21 which engages in the lug 8 of the loop 7. A plurality of spokes 24 provide a rigid connection between the entraining element 12 and the hand wheel 25.

In operation, when the hand wheel 25 is rotated in counter-clockwise manner, the spring end which has the loop 7 bears on the shaft 2. Initially, the spring end slides on the shaft 2. However, as the angle of looping of the spring 6 increases around the shaft 2, the friction of the spring 6 on the shaft 2 increases until the shaft 2 is driven. The spring end distal from the loop 7 trails along in the lining sleeve 4 but the corresponding friction can be kept to tolerable levels by appropriate size and construction of the spring 6.

Should the servomotor 1 suddenly start to run counterclockwise, the shaft 2 pushes the spring 6 clear of the free shaft end without the hand wheel 25 being driven.

Should the servomotor 1 suddenly start to run clockwise, the hand wheel 25 is initially moved slightly at a low speed corresponding to the motor starting characteristic. This motion usually is barely discernable to an operator. During this movement, the entraining element 12 also moves while the spring 6 disengages from the shaft 2 so that torque ceases to be exerted.

It is to be noted that turning of the hand wheel 25 clockwise causes the spring 6 to spread further in the lining sleeve 4. That is, the hand wheel 25 cannot be turned clockwise. Thus, the hand drive as shown in FIG. 1 permits only a counter-clockwise manual rotation.

Figure 2:
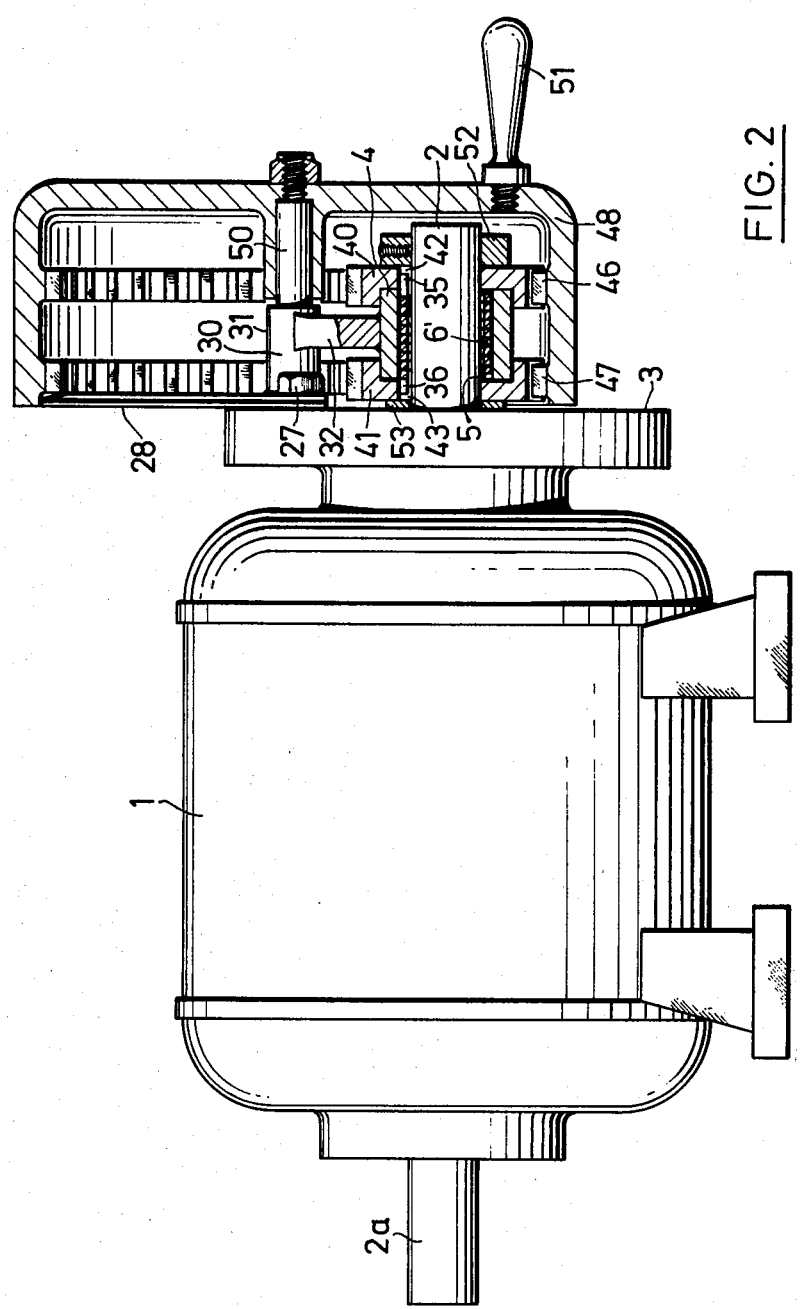
FIG. 2 illustrates a part cross-sectional view of a hand drive coupled to a servomotor for rotation of a shaft in two opposite directions.

Referring to FIG. 2, wherein like reference characters indicate like parts as above, the servomotor 1 has an output end 2a opposite the shaft 2. The hand drive for rotating the shaft 2 is mounted on the servomotor 1 via a semicircular disk 28 which is bolted to the flange 3 via 5 bolts 27.

The hand drive has a shouldered pin 30 which is welded to the disc 28 and is disposed eccentrically of the shaft 2. A connecting arm 32 is welded to a thicker part 31 of the pin and carries the lining sleeve 4 which extends concentrically around the shaft with a radial clearance 5. A right handed spring 6' having axially cranked ends 35, 36 is disposed in the sleeve 4. In addition, a pair of entraining elements 40, 41 are disposed at each end of the sleeve 4. Each element 40, 41 is formed with a spline like recess 42, 43 which receives the spring ends 35, 36. The elements 40, 41 are also in the form of externally toothed discs or gears and mesh with two internal toothings 46, 47 of a drum-like member 48. This member 48 is rotatably mounted on a shouldered part 50 of the pin 30. In addition, a handle 51 is secured to the exterior of the member 48 for rotating the member 48.

A ring 52 is clamped to the shaft 2 via a set screw and a shim 53 is provided at the opposite end to prevent unwarranted lateral movement of the elements 40, 41.

Figure 3:
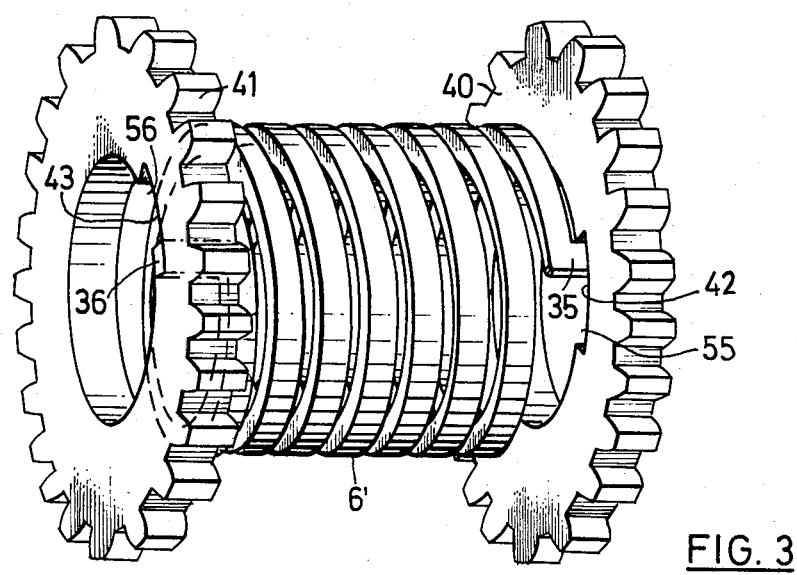
FIG. 3 illustrates a perspective view of a spring and two entraining elements as utilized in the hand drive of FIG. 2.

The external toothing of the entraining elements 40, 41 is not shown in FIG. 3. As is apparent, the two spring ends 35, 36 are received in spline-like recesses 42, 43 in the elements 40, 41 with a peripheral clearance 55, 56 on one side while engaging the elements 40, 41 on the opposite side. When the spring 6' is fitted into the sleeve 4, the radial compression of the spring 6' reduces this clearance. In order to restore the one-sided clearance to the required value, the elements 40, 41 are rotated relative to one another to the extent permitted by the tooth pitch, while the drum-like member 48 is moved in.

The hand drive as shown in FIGS. 2 and 3 operates as follows:

Rotation of the handle 51 counter clockwise moves the elements 40, 41 counter clockwise. At this time, the entraining element 40 entrains the cranked end 35 of the spring 6'. The first convolutions of the spring 6' engage with the shaft 2. Once the angle of looping of the spring around the shaft 2, and therefore the friction, are sufficient, the shaft 2 starts to turn. As the spring releases increasingly from the lining sleeve 4, the left hand end 36 of the spring slides along in the sleeve 4 because of the clearance 56 but without abutting the flank of the recess 43 (FIG. 3).

When the motor 1 starts, the system operates as described with reference to FIG. 1.

Clockwise rotation of the handle 51 causes the entraining element 41 to move the left hand end of the spring 6'. The shaft 2 turns but in the opposite direction to that as described above while the right hand spring end 35 moves freely in the clearance or gap 55.

Being symmetrical, the hand drive responds to an abrupt start of the motor to either hand of rotation in a manner similar to that described with respect to the embodiment of FIG. 1.

Figure 4:
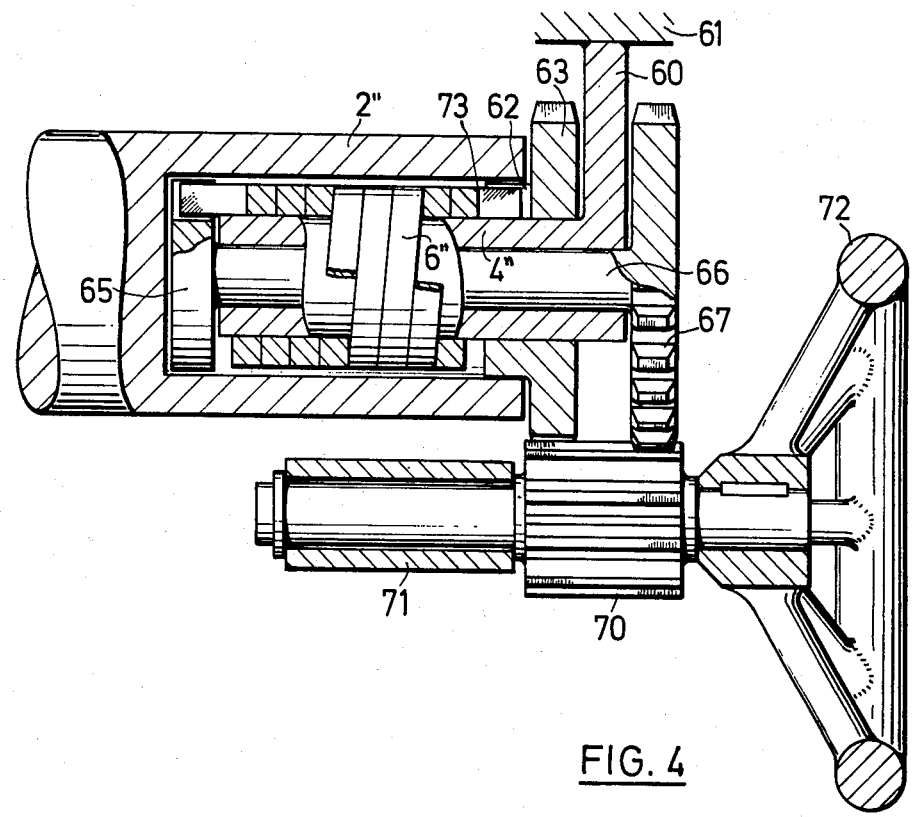
FIG. 4 illustrates a further modified hand drive according to the invention having a spring located within a driven shaft.

Referring to FIG. 4, the hand drive may be coupled internally of a shaft 2''. As shown, in this case, a spring 6'' is disposed in a cylindrical axial bore of a shaft 2'' with a reduced radial clearance and bears with a slight biasing on a stationary lining sleeve 4''. The sleeve 4'' is, in turn, secured via an arm 60 to a stator 61 of a rotating servomotor (not shown). As in FIG. 3, the spring 6'' has both ends cranked axially. The right hand end of the spring 6'' is received with a peripheral clearance on one side in a recess 62 of a discoid externally toothed entraining element or gear 63 disposed on the sleeve 4''. The left hand end of the spring extends into a recess in a second entraining element 65 which is connected to a gear 67 via a shaft 66 which extends inside the sleeve 4''. The two gears 63, 67 also mesh with a pinion 70 which is floatingly mounted in a bearing 71 and which carries a hand wheel 72 at the free end.

Unlike the embodiment of FIG. 3, the crank spring ends of FIG. 4 have a clearance, when assembled, on the side of the catch corner 73 of the crank.

During operation, clockwise rotation of the hand wheel 72 produces a counter clockwise rotation of the gears 63, 67 and entraining element 65. The spring 6'' is therefore driven at the right hand end and expanded against the inside wall of the shaft 2''. As previously stated, the friction between the spring and the shaft increases until the shaft starts to be driven. When this occurs, further convolutions of the spring unwind from the lining sleeve and are pressed against the inner wall of the shaft until just the left hand of the spring trails relatively loosely on the lining sleeve 4''. During this "winding-up" operation, the left hand end of the spring moves within the clearance or gap but does not abut the sidewall of the recess. This hand drive, as the one shown in FIG. 2, operates for both directions of hand wheel rotation. However, in contrast to the embodiment of FIG. 2, this hand drive has a speed step down between the hand wheel and the shaft 2''. Of course, it is important for the hand drive to act on the two entraining elements with the same transmission ratio.

In the embodiments described above with reference to FIGS. 2 and 4, the spring ends have clearances on one side in the recesses of the entraining elements. Alternatively, the clearance can be present between the entraining elements and the transmission parts 63, 67 and/or 70 engaging therein, subject to the clearance being on the correct side.

Figure 5:
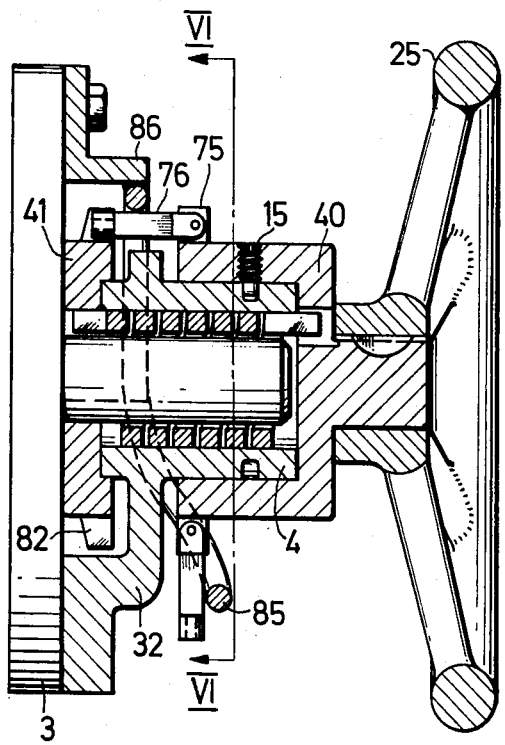
FIG. 5 illustrates a further modified hand drive according to the invention having two entraining elements interconnected by torque-transmitting elements.
Figure 6:
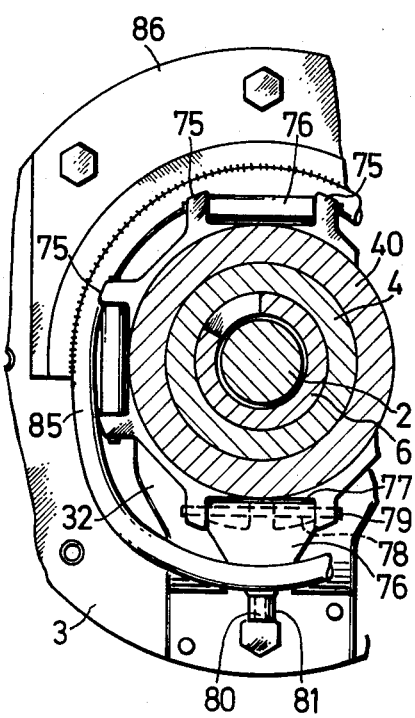
FIG. 6 illustrates a view taken on line VI—VI of FIG. 5.

Referring to FIGS. 5 and 6, the lining sleeve 4 is secured via an arm 32 to the flange 3 of the servomotor in the same way as described in FIG. 2. In addition, the entraining elements 40, 41 are mounted on the cylindrical outside surface of the lining sleeve 4. The entraining element 40 is also driven directly from the head wheel 25; however, instead of being coupled with the entraining element 41 via gearing, the element 40 is connected to the element 41 via a plurality of torque-transmitting elements 76, e.g. four such elements. Each of these elements 76 is pivotally mounted on cams 75 of the entraining element 40 so as to pivot in a plane axially of the shaft. As shown in FIG. 6, each member 76 is of a shape which is substantially triangular and each has a bore 78 at the base 77 which receives a pin 79 mounted in the cam 75. In addition, a pin 80 is disposed at the apex of the triangle and extends perpendicularly to the base 77. The pin 80 carries a roller 81 which is secured against axial movement. The entraining element 41 has a flange-like bead 82. At a plurality of places, e.g. four places distributed uniformly over its periphery the bead 82 has an axial cut with an internal width corresponding to the outside diameter of a roller 81. In order to transmit the rotation of the element 40 to the element 41, the torque-transmitting elements 76 are received in the cuts of the bead 82.

The transmission also includes stationary cams for pivoting the lower-most positioned torque-transmitting element 76 in sequence during rotation of the hand wheel 25. One cam namely the arm 32 is formed so as to pivot the lower-most positioned element 76 when the entraining elements 40, 41 rotate. The other cam 85 is formed as a slightly cranked ring which is welded to a substantially semicircular flange part 86. This ring 85 limits the movement of the elements 76 and re-engages the elements 76 in the cuts of the bead 82 after passage by the arm 32. FIG. 6 illustrates the lowermost element 76 in a disengaged position while the other three elements 76 are engaged in the cuts of the bead 82.

Figure 7:
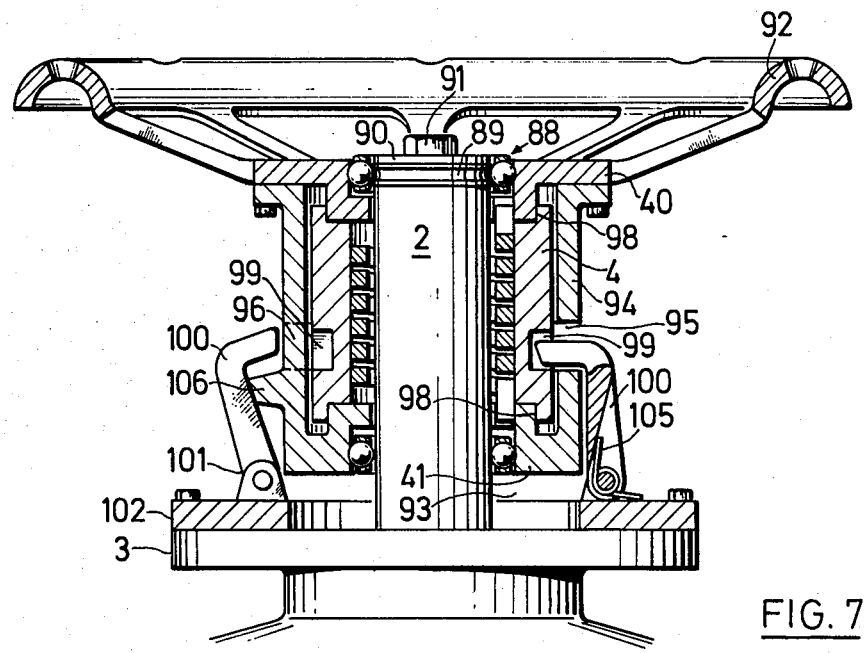
FIG. 7 illustrates a further modified hand drive in accordance with the invention.

Referring to FIG. 7, the hand drive can also be constructed without gear wheels for interconnecting the entraining elements 40, 41. In this regard, whereas the embodiment illustrated in FIGS. 5 and 6 employ consecutively operated pivoted elements to couple the entraining elements together, the embodiment of FIG. 7 has the entraining elements 40, 41 fixedly coupled together. In addition, the lining sleeve 4 is retained by pawls 100 which act alternately thereon.

More specifically, as shown in FIG. 7, the entraining element 40 forms an outer race ring of a ball bearing 88. An inner race ring 89 of the bearing 88 is retained on a shoulder of the shaft 2 by means of a shim 90 and a bolt 91. The entraining element 41 forms an outer race ring of a ball bearing 93 but runs directly on the shaft 2. The elements 40, 41 are interconnected by a coupling sleeve 94 which is provided with a plurality of peripherally disposed apertures 95. These apertures or slots 95 are separated from one another by three narrow webs 96. The lining sleeve 4 is mounted on cylindrical surfaces 98 of the elements 40, 41 and is formed with two diametrically opposite recesses 99 in which the pivotable pawls 100 engage alternately and, in so doing prevent the sleeve 4 from rotating around the shaft 2. The pawls 100, as the element 76, are of substantially triangular shape and are pivotally mounted at the base 101 on a ring 102 screwed to the flange 3. In addition, pivots springs 105 bias the pawls 100 radially inward into the lining sleeve recesses 99 and against cams 106 disposed near the webs 96 on the coupling sleeve 94. These cams 106 are disposed to raise the pawls 100 clear of the webs 96 to obviate a collision therewith when the hand wheel 92 is turned.

Since at least one pawl 100 is in engagement with the sleeve 4 at any time, the sleeve 4 remains in position when the elements 40, 41 rotate. Since only the trailing or dragging moment of the spring is operative on the sleeve 4 and such moment is less than the hand drive torque acting on the shaft 2, the pivoting lever hand drive can be of lighter construction than in the case of the embodiment of FIGS. 5 and 6.

The pawls 100 can, of course, have rollers so as to reduce the friction of their engagement with the cams 106 and their movements into and out of the recesses 99. As indicated, the entraining element 40 and wheel 92 are of a unitary sheet metal pressing.

Figure 8:
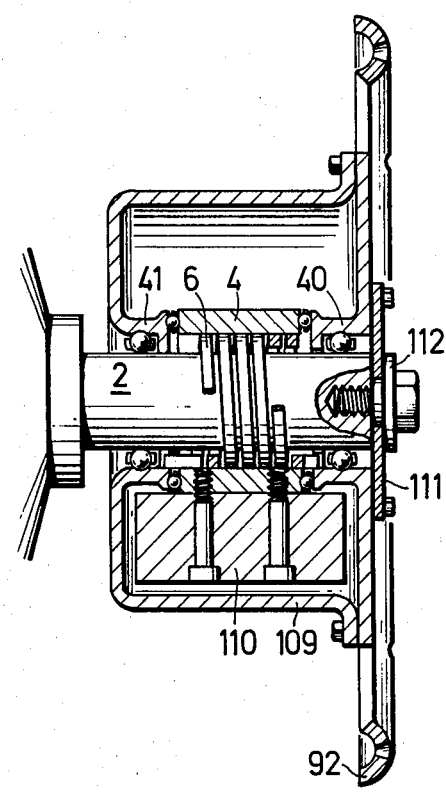
FIG. 8 illustrates a cross-sectional view of a further modified hand drive according to the invention which is not fixed to a servomotor.

Referring to FIG. 8, the hand drive may also be constructed so that the lining sleeve 4 is rotatably mounted on two rigidly coupled entraining elements 40, 41. In order to prevent the sleeve 4 from being moved by the spring 6 in manual operation, an eccentric weight 110 is provided on one side of a size to balance the spring torque without excessive lateral deflection. A carefully matched soft spring applying only a reduced dragging force to the lining sleeve 4 is therefore used in this embodiment. Further, this embodiment can be used only with a non-vertical shaft 2, that is, with a shaft which is substantially horizontal. This construction is of relatively simple assembly and can be pushed onto the shaft 2 and secured against axial movement by means of an annular disc 111 and a stepped disc 112 on the shaft end face as indicated. When in use, the eccentric weight 110 retards rotation of the sleeve 4 with the entraining elements 40, 41.

Figure 9:
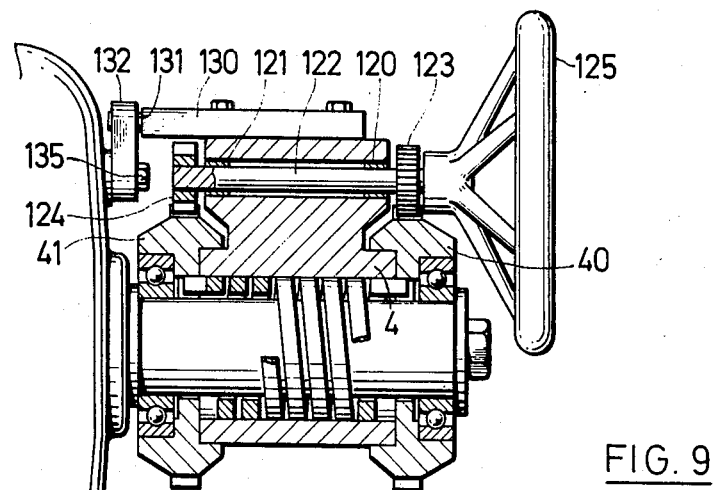
FIG. 9 illustrates a further modified hand drive in accordance with the invention.

Referring to FIG. 9, the hand wheel may also be constructed so as to insure simple and rapid assembly. In this regard, the lining sleeve 4 is fixed mounted with the entraining elements 40, 41 rotatably mounted thereon. The sleeve 4 also carries bearing sleeves or shells 120, 121 for a spindle 122. The spindle 122, in turn, carries two identical pinions 123, 124 which mesh with the elements 40, 41 as well as a hand wheel 125. The lining sleeve 4 also has a metal bar 130 which is secured thereon via suitable bolts. This bar 130 is provided with a pin 131 at one end to which a link 132 is mounted. The link 132 is, in turn, secured by a shoulder screw 135 to the servomotor stator in order to prevent rotation of the sleeve 4.

Figure 10:
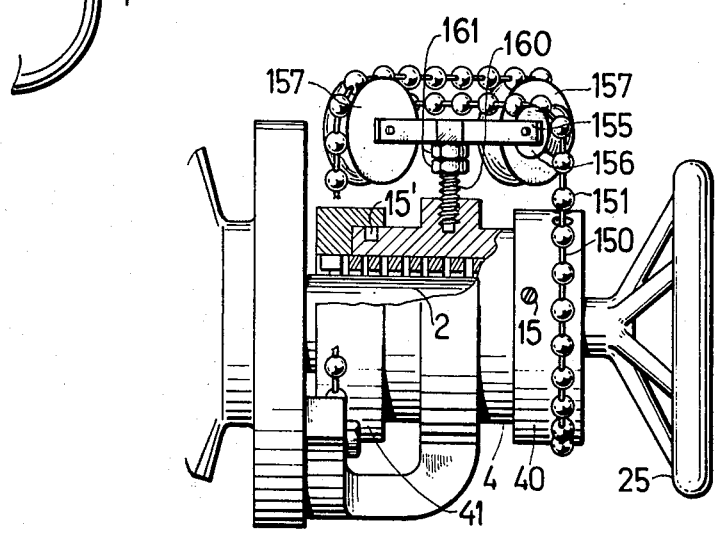
FIG. 10 illustrates a view of a hand drive in accordance with the invention utilizing a crossed chain-like drive member.
Figure 11:
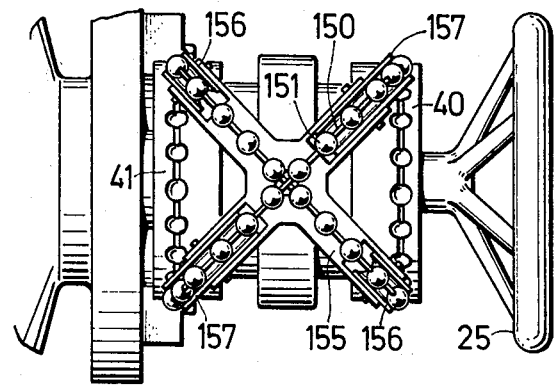
FIG. 11 illustrates a plan view of the hand drive of FIG. 10.

Referring to FIGS. 10 and 11, the hand drive may also be made of relatively inexpensive construction by using a crossed chain-like drive member. As shown, the two entraining elements 40, 41 are coupled together via a chain drive. The elements 40, 41 are mounted for rotation on a stationary lining sleeve 4 and are secured by grub screws 15 and corresponding grooves 15. The chain is in the form of spherical members 151 which are interconnected by way of links 150. The chain is deflected and crossed over by two small and two large cable drive rollers 156, 157 which are respectively disposed on a cruciform carrier 155. These spherical members 151 of the chain engage in hemispherical recesses which are disposed in the entraining elements 40, 41 along a narrow annular groove for the chain links 150. A screw 160 centers the carrier 155 while two opposite acting nuts 161 allow the chain to be adjusted relative to the screw 160. The hand wheel 25 is rigidly connected to the entraining element 40.

If the entraining elements 40, 41 and the drive rollers 156, 157 are made of plastics, this construction is relatively inexpensive.

It is to be noted that the various embodiments illustrated are not limiting. Instead, the various features of the different embodiments can be combined with one another in various ways to suit special requirements. The means used can be replaced by equivalent means, for example, for the embodiment of FIG. 8, the lining sleeve 4 can be retained not by a weight 110 but by a permanent magnet which is secured to the lining sleeve 4 and which bears on a stationary field passing through the shaft 109 of a second permanent magnet secured to the motor.

Further, the wire cross-section of the spring 6 can be trapezoidal instead of square. This increases the surface pressure of the spring on the shaft with the purpose of a ready penetration of an oil film thereon. The spring 6 can also be other than cylindrical. For example, the spring can be a hyperbola of rotation or barrel-shaped inside and/or outside. The shaft and/or lining sleeve may be other than cylindrical on the spring side, to give the rotation/torque characteristic a special pattern.

Instead of a single system of the kind shown in FIGS. 2 to 11 which is operative in both directions of hand wheel rotation, two systems operating as in FIG. 1 can be provided and can, for instance, be coupled together by means of a differential transmission.

Although the hand drive has been devised particularly for use with rotating servomotors, the hand drive can be used for similar work, e.g. on the shafts of numerically controlled lathes, automatic conveyors and so on.

What is claimed is:

1. In combination with a rotatably driven shaft;
a hand wheel for manual turning of said shaft; and
a coupling for coupling said hand wheel onto said shaft, said coupling including a lining sleeve concentric of said shaft and defining a gap with said shaft, a helical spring in said gap concentrically between said sleeve and said shaft, said spring having convolutions radially biassed into engagement with said sleeve and spaced from said shaft, and means for connecting at least one end of said spring with said hand wheel whereby upon rotation of said handwheel in one direction said spring convolutions near said end of said spring disengage from said sleeve and engage with said shaft to rotate said shaft.

2. The combination as set forth in claim 1 which further comprises a stationary member and means securing said lining sleeve to said member to prevent rotation of said lining sleeve.

3. The combination as set forth in claim 1 wherein said spring is made of a rectangular-section wire.

4. The combination as set forth in claim 1 wherein said means includes a pair of entraining elements coaxially of said shaft, each said element being entrained with an opposite end of said spring and connected to said hand wheel to turn in unison therewith, and an eccentric weight connected to said sleeve to retard rotation of said sleeve with said entraining elements, said shaft being disposed horizontally.

5. The combination as set forth in claim 1 wherein said means includes a pair of entraining elements coaxially of said shaft, each said element being entrained with an opposite end of said spring and a cross chain-like drive member connecting said elements in unison.

6. The combination as set forth in claim 1 wherein said means includes a pair of entraining elements coaxially of said shaft, each said element being entrained with an opposite end of said spring and a transmission element connecting said entraining elements in unison to said hand wheel, said transmission element being mounted on said lining sleeve.

7. The combination as set forth in claim 6, which further includes a stationary member and a link connecting said sleeve to said stationary member.

8. The combination as set forth in claim 1 wherein said coupling further has a pair of entraining elements coaxially of said shaft, each said element being entrained with an opposite end of said spring and a coupling sleeve rigidly coupling said elements together.

9. The combination as set forth in claim 8 wherein said coupling sleeve includes a plurality of peripherally disposed apertures and said sleeve has a plurality of recesses aligned with said apertures and wherein said coupling further includes a plurality of pawls for alternating movement through said coupling sleeve apertures into and out of said recesses to prevent rotation of said sleeve.

10. The combination as set forth in claim 9 wherein said coupling includes cams on said coupling sleeve for moving said pawls relative to said coupling sleeve recesses.

11. The combination as set forth in claim 10 wherein said coupling includes springs for biasing said pawls into said lining sleeve recesses and against said cams.

12. The combination as set forth in claim 1 wherein said means includes a pair of entraining elements coaxially of said shaft, each said element being entrained with an opposite end of said spring and a transmission connecting said elements in unison to said hand wheel to turn at the same speed.

13. The combination as set forth in claim 12 wherein each entraining element has a recess receiving a respective end of said spring with a peripheral clearance on one side.

14. The combination as set forth in claim 12 wherein said transmission maintains a clearance between the spring end opposite from a driven spring end and said entraining element thereat.

15. The combination as set forth in claim 12 wherein each entraining element is a toothed gear and wherein said transmission includes a pinion meshing in common with each said gear.

16. The combination as set forth in claim 12 wherein each entraining element is a toothed gear and said transmission includes an internal toothing meshing in common with each said gear.

17. The combination as set forth in claim 16 wherein said transmission includes a rotatable drum-like member having said internal toothing therein and a handle on an exterior of said member for rotating said member.

18. The combination as set forth in claim 12 wherein said transmission includes a plurality of releaseable torque-transmitting elements interconnecting said entraining elements.

19. The combination as set forth in claim 18 wherein said transmission further includes stationary cams for releasing and engaging said torque-transmitting elements in sequence during rotation of said hand wheel.

20. The combination as set forth in claim 18 wherein each torque-transmitting element is pivotally mounted to pivot in a plane axially of said shaft.

21. The combination as set forth in claim 20 wherein said transmission further includes stationary cams for pivoting each said torque-transmitting element in sequence during rotation of said hand wheel.

22. The combination as set forth in claim 12 wherein at least one of said entraining elements is mounted on said shaft.

23. The combination as set forth in claim 22 wherein said sleeve is rotatably mounted on said entraining elements.

24. A hand drive for mounting on a rotatable shaft, said drive comprising
a sleeve mounted concentrically about the shaft to define an annular gap therewith;
a helical spring concentrically within said sleeve and having convolutions radially biased into engagement with said sleeve;
a pair of entraining elements mounted at opposite ends of said sleeve in relatively rotatable relation to said sleeve, said elements being rigidly connected to each other and being entrained with an opposite end of said spring; and
a hand wheel rotatably engaging said elements.

25. A hand drive as set forth in claim 28 which further includes an eccentric weight connected to said sleeve to retard rotation of said sleeve with said elements.

26. A hand drive as set forth in claim 28 wherein said sleeve has a plurality of recesses which further includes a coupling sleeve coupling said elements together and having a plurality of peripherally disposed apertures aligned with said recesses, a plurality of pawls for alternating movement through said coupling sleeve apertures into and out of said recesses to prevent rotation of said lining sleeve relative to said coupling sleeve, cams on said coupling sleeve for moving said pawls relative to said coupling sleeve recesses, and springs for biasing said pawls into said lining sleeve recesses and against said cams.

27. A hand drive for mounting on a rotatable shaft, said drive comprising a sleeve mounted concentrically about a shaft to define an annular gap therewith;

a helical spring concentrically within said sleeve and having convolutions radially biased into engagement with said sleeve;

a pair of entraining elements rotatably mounted on opposite ends of said sleeve, each said element being entrained with an opposite end of said spring and having external teeth thereon;

a hand wheel having a spindle passing through said sleeve;

a pair of pinions mounted on said spindle, each pinion being in meshing engagement with a respective entraining element; and means for securing said sleeve to a fixed member.

* * * * *

UNITED STATES PATENT AND TRADEMARK OFFICE
CERTIFICATE OF CORRECTION

PATENT NO. : 4,295,552
DATED : October 20, 1981
INVENTOR(S) : Hans Erlach

It is certified that error appears in the above—identified patent and that said Letters Patent is hereby corrected as shown below:

Column 1, line 57, change "with" to --which--

Change "of a" to --of the--

Column 3, line 34, first word change "preferrably" to

--preferably--

Column 6, line 45, change "head" to --hand--

Column 8, line 9, change "fixed" to --fixedly--

Column 8, line 27, change "15" to --15'--

Column 11, line 13, change "mounted" to --mounting--

Column 10, line 64, change "28" to --24--

Column 10, line 67, change "28" to --24--

Signed and Sealed this

Ninth Day of March 1982

[SEAL]

Attest:

GERALD J. MOSSINGHOFF

Attesting Officer　　Commissioner of Patents and Trademarks